United States Patent Office 3,223,624
Patented Dec. 14, 1965

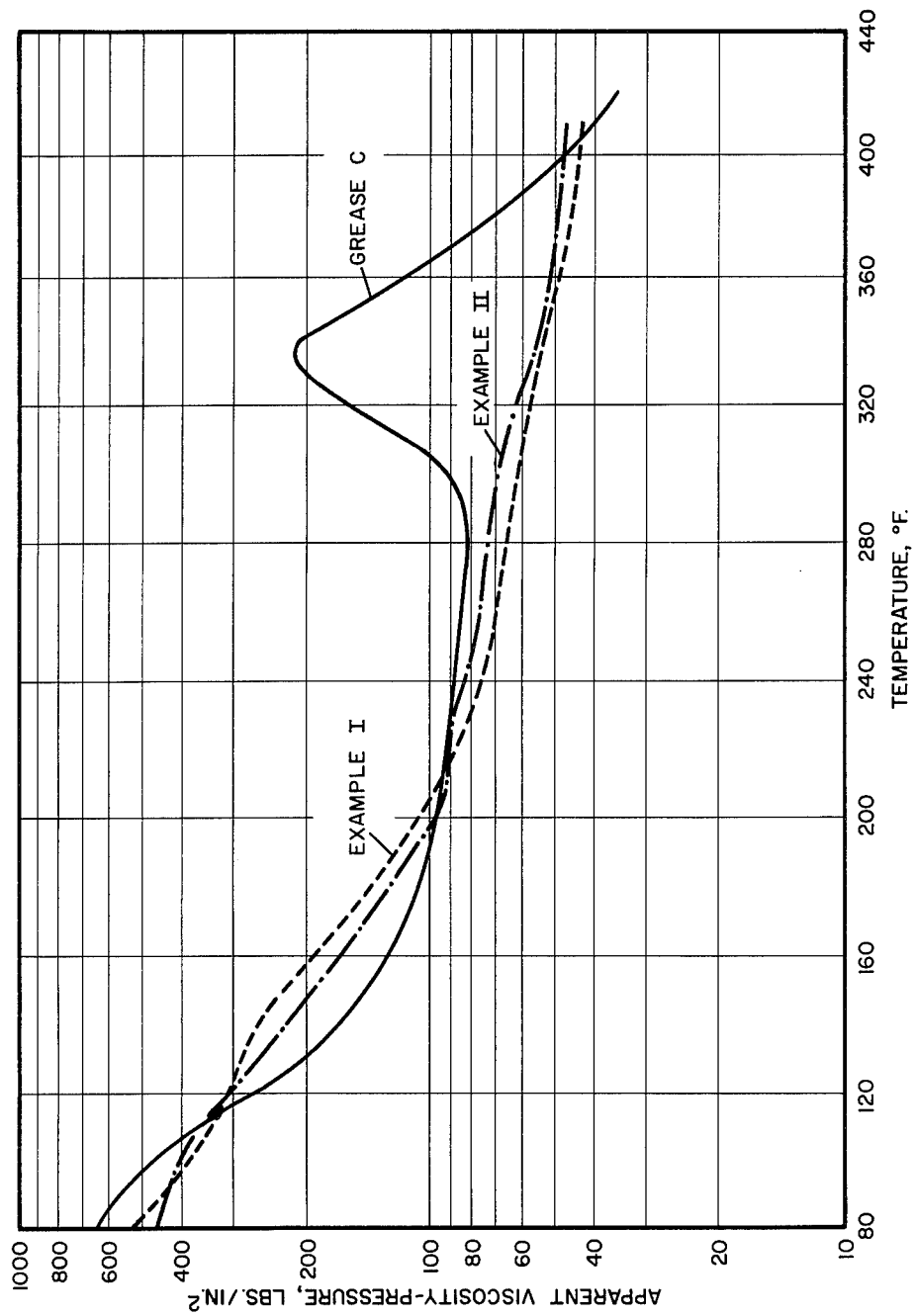

3,223,624
LUBRICATING GREASE
Arnold J. Morway, Clark, and Hugh E. Ramsden, Scotch Plains, N.J., assignors to Esso Research and Engineering Company, a corporation of Delaware
Filed Dec. 7, 1962, Ser. No. 243,058
6 Claims. (Cl. 252—18)

This invention relates to a lubricating grease containing mixed alkali metal salt of dicarboxylic acid and fatty acid as thickeners. Particularly, the invention relates to a lubricating grease suitable for lubrication of anti-friction bearings comprising a lubricating oil thickened with a mixture of alkali metal salt of: a dicarboxylic acid, a low molecular weight fatty acid and a high molecular weight fatty acid, in certain critical molar proportions, which lubricating grease may optionally contain alkali metal phosphate.

A general property of the normally solid greases of the invention is good ability to shear-harden when a shearing stress is exerted on the greases. This ability to shear-harden is of particular importance in the lubrication of anti-friction ball bearings. In such ball bearing lubrication, a non-hardening type grease tends to churn in the rotating bearing, thereby imparting resistance to the rotation of the bearing, which in turn increases friction and generates unwanted heat. On the other hand, when using the grease of this invention, the rotating bearing shear-hardens the grease. The result is that the rotating balls, or rollers, will after a time form a channel through the grease. Once the channel is formed, the grease is still available for lubrication, but does not impede the rotating balls or bearing movement, thereby giving lower torque requirements, less friction, a lower power requirement and a cool-running bearing.

Channelling-type greases, are of course known, and are preferred for lubrication of anti-friction bearings for lubricated-for-life electric motors, since the bearings do not require as much torque to turn as those lubricated with a non-channelling grease. However, in a new motor, prior channelling-type greases frequently cause loud whistling and other bearing noises. These noises usually abate after the motor is used for a time and becomes broken-in. However, these initial noises are very undesirable because of their unfavorable effect on the consumer, who might thereby think the motor is defective. On the other hand, a non-channelling type grease, by churning in an operating bearing, dampens this bearing noise (which is usually caused by separator-flutter) although the non-channelling grease is much less satisfactory for lubricating the motor. Now a very important aspect of the present invention is the formation of a grease which allows short-term initial churning of the grease in bearings to thereby prevent noise, but which gradually becomes a channelling grease during use.

The greases of the invention also differ from previously known, related alkali metal high temperature bearing greases wherein the thickener is a mixed salt of low molecular weight fatty acid, e.g. acetic acid, and higher molecular weight fatty acid, e.g. $C_{12}$ to $C_{24}$ fatty acid. Thus, in contrast to said previously known greases, the greases of the invention do not become excessively fluid at elevated temperatures, or become excessively rubbery or fibrous at elevated temperatures, due to phase changes in the soap-thickening structure.

While the use of dicarboxylic acid in preparing salt thickeners has been suggested in several patents, there are significant differences between the present invention and the prior art. Thus, U.S. Patent 2,699,428 teaches co-neutralization with metal base of certain dicarboxylic acids (e.g. sebacic acid) and $C_8$ to $C_{22}$ monocarboxylic acids to form a grease thickener. U.S. Patent 2,583,607 teaches mixed aluminum salts of $C_2$ to $C_6$ dicarboxylic acid and $C_{12}$ to $C_{24}$ fatty acid as a grease thickener. However, the present invention differs from the invention of these prior patents in using alkali metal salts, preferably sodium or lithium, of a combination of $C_2$ to $C_4$ lower fatty acid, certain dicarboxylic acid, and a $C_{12}$ to $C_{24}$ fatty acid. By the use of the lower fatty acid, an improvement over the greases of U.S. Patent 2,699,428 is obtained in that the low molecular weight acid imparts high dropping point, structural stability to extended mechanical working, and most important, materially contributes to the grease shear hardening. Also, the addition of the dicarboxylic acid allows the relatively high mole ratios (above 1:1) of the low molecular weight acid (particularly acetic) to the high molecular weight monocarboxylic fatty acid in the alkali metal thickener of the invention.

Furthermore, the use of lower molecular weight dicarboxylic acids, such as taught by U.S. 2,583,607, in the molar ratios desired for the practice of the present invention will result in undesirable grainy, gritty, un-homogeneous greases. As a result, the present invention differs from the invention of U.S. 2,583,607 in using higher molecular weight dicarboxylic acid which avoids grain and grit to thereby permit the formation of homogeneous greases.

The mixed-salt thickener systems of the invention are best made to contain alkali metal salt of 2 to 10, preferably 3 to 6 molar hydrogen equivalents of low molecular weight $C_2$ to $C_4$ fatty acid per molar hydrogen equivalent of dicarboxylic acid. These systems will also contain salt of 1 to 4, preferably 1 to 3 molar hydrogen equivalents of $C_{12}$ to $C_{24}$ high molecular weight fatty acid per molar hydrogen equivalent of said dicarboxylic acid. Greases can be thus prepared having a total content of said salts of 5.0 to 49.0 weight percent, preferably 20 to 45 weight percent, based on the weight of the grease. These greases in turn can be diluted with additional oil to form fluid or semi-fluid compositions containing about 0.1 to 5.0% of the mixed salt.

Suitable low molecular weight acids for forming the mixed salt compositions of the invention include fatty acids such as acetic and propionic acids. Acetic acid or its anhydride is preferred.

The high molecular weight fatty acids or aliphatic carboxylic acids useful for forming the mixed salt of the invention include naturally-occurring or synthetic, substituted or unsubstituted, saturated or unsaturated, mixed or unmixed fatty acids having about 12 to 24, e.g. 16 to 24 carbon atoms per molecule. Examples of such acids include myristic, palmitic, stearic, 12-hydroxy stearic, arachidic, oleic, ricinoleic, hydrogenated fish oil, tallow acids, etc.

Recently, a very low price fatty acid material comprising chiefly elaidic acid with minor amounts of oleic acid (9-octadeceneoic acid), and other isomers of oleic acid, e.g.12-octadeceneoic acid and lineoleic acid, etc. has become commercially available under the general name of iso-oleic acid. This acid primarily differs from pure oleic acid in that its chief component, i.e. elaidic acid, is in the cis or syn isomeric form, rather than in the more common trans or anti form oleic acid.

The iso-oleic acid may be 100% oleic acid in the cis form, i.e. elaidic acid. However, commercial iso-oleic acid generally constitutes mixtures of a major amount of elaidic acid with minor amounts of oleic acid (i.e. 9-octadeceneoic acid) and other related acids such as 12-octadeceneoic, linoleic, linolic, stearic, palmitic, etc.

An iso-oleic acid, available from Emery Industries, under the name Emery 636 fatty acid, was used in the working examples of the invention. This acid had the following typical characteristics:

| | |
|---|---|
| Titer [1], °C. | 32 |
| Iodine valve (Wijs) | 70 |
| Free fatty acids (percent as oleic) | 91 |
| Acid value | 182 |
| Saponification value [2] | 189 |
| Color, Gardner | 8 |

[1] The titer noted above is a false titer, since in derivatives, the acid acts as a lower titered acid.
[2] Contains an inter-ester easily broken by saponification techniques.

The dicarboxylic acid of the invention includes aliphatic acid of 10 to 16, preferably 10 to 12 carbon atoms, which can be either straight or branched chain. Examples of such acids include sebacic and dodecanedioic acids. Higher aliphatic dicarboxylic acids, e.g. a $C_{19}$ Koch acid, appear to result in greases of shorter lubrication life at elevated temperatures and therefore are not preferred for this invention. In addition to said $C_{10}$ to $C_{16}$ aliphatic dicarboxylic acid, certain polynuclear aromatic dicarboxylic acids can be used. These polynuclear acids can be typified by the formulas:

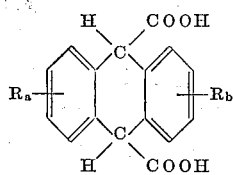

and

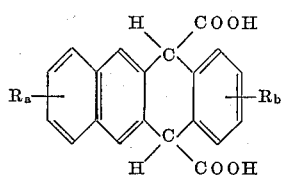

where R represents alkyl groups containing 1 to about 8 carbon atoms, $a$ and $b$ can be 0 to 4, but the sum of $a$ and $b$ will usually be no greater than about 6. A particularly preferred aromatic polynuclear dicarboxylic acid is available from petroleum refining and can be formed by treatment of the highly aromatic extract derived by extraction of catalytic cracking cycle stock, with $CO_2$ and sodium to form a salt of the aromatic acid, said salt being subsequently hydrolyzed with strong acid to separate the free dicarboxylic acid. The exact nature of the resulting dicarboxylic acid is not known with certainty but analysis shows it to be mainly 3 and 4 ring alkyl polynuclear dicarboxylic acids of the two types shown by the formulas above.

The metal component of the mixed thickeners is an alkali metal, preferably sodium and/or lithium.

The lubricating oil used in the compositions of the invention may be either a mineral lubricating oil or a synthetic lubricating oil. Synthetic lubricating oils which may be used include esters of dibasic acids (e.g. di-2-ethylhexyl sebacate), ester of glycols (e.g. $C_{13}$ oxo acid diester of tetraethylene glycol), complex esters (e.g. the complex ester formed by reacting one mole of sebacic acid with two moles of tetraethylene glycol and two moles of 2-ethyl-hexanoic acid), halocarbon oils, alkyl silicates, sulfite esters, mercaptals, formals, polyglycol type synthetic oils, etc., or mixtures of any of the above in any proportions. If the salts are formed in situ in the oil, then this in situ reaction is best carried out in a mineral oil, since many synthetic oils will tend to decompose or hydrolyze during the salt formation. However, the salts once formed, can be used in lubricants containing the synthetic oils noted above.

It has been further found that by the addition of alkali metal phosphates, e.g. trisodium ortho phosphate, to the grease, that not only does a harder grease result but the trisodium phosphate imparts anti-oxidation properties and increases the lubrication life of the grease. Usually, about 0.1 to 6.0, preferably 1.0 to 5.0 wt. percent, of trisodium phosphate will be used. On using amounts of trisodium phosphate in excess of the recited ranges, the grease structure will generally become undesirably rubbery and cohesive. The trisodium phosphate is preferably added in a finely divided form as possible to avoid imparting grittiness to the grease as can otherwise occur when the trisodium phosphate particles are too large.

Various other alkali metal salts of phosphoric acid can optionally be included in the greases of the invention, such as lithium ortho phosphate, potassium ortho phosphate, sodium pyrophosphate, sodium tripolyphosphate, etc. However, trisodium phosphate is preferred, since it is economical and, in general the most effective of these salts in imparting antioxidant, antiwear and some load-carrying ability to the grease.

The trisodium phosphate can be incorporated in the grease in a number of different ways. However, it should preferably be present in a finely divided form, e.g. 15 microns or less, in order to secure good stability and avoid grittiness of the grease. One method of obtaining such finely divided trisodium phosphate in the grease of the invention is to form it in situ in the oil by neutralizing ortho phosphoric acid, in the oil, with sodium hydroxide. Or, preformed trisodium phosphate, mechanically milled to very fine particle size, can be simply dispersed in the grease. Or, preformed trisodium phosphate can be prepared in situ in a carrier by neutralizing phosphoric acid with sodium hydroxide, then precipitating the trisodium phosphate from said carrier in the presence of a protective material which will coat the small particles of trisodium phosphate as they precipitate. Still another method involves crystallizing trisodium phosphate from an aqueous solution in the presence of oil containing a protective stabilizing material. Trisodium phosphate prepared by this last-mentioned method, using an imidazoline salt as the stabilizing material, was used in the examples of the invention. Specifically, in this last-mentioned method, trisodium phosphate is dissolved in water, preferably to form a saturated solution. This solution is then added to a small amount of mineral oil in which is dispersed a surface active agent of the amino imidazoline salt type. The resulting mixture is heated to drive off most of the water. The mass is then cooled to form a grease-like solid mass containing finely divided particles of dry trisodium phosphate coated with the amino imidazoline salt. This grease-like mass can then be used in preparing the grease of the invention.

The amino imidazoline useful to form the salt surfactant in the just-described process, include those having the general structure:

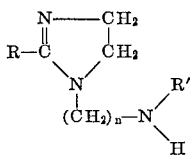

In the above formula, n is about 2 to 6, preferably 2 to 3; R is a $C_6$ to $C_{22}$, preferably a $C_{16}$ to $C_{18}$, hydrocarbon group, either saturated or unsaturated, and preferably aliphatic; while R' is either hydrogen or a $C_1$ to $C_{18}$ alkyl group. Preferably, the number of carbon atoms in R is small, R' is hydrogen and n is a small integer, e.g. 2, in order that the effectiveness of the imidazoline is as great as possible per pound of material. In other words, the effectiveness of the imidazoline in the present invention apparently depends on the ring structure and the terminal amino group, while the number of carbon atoms in the branches merely dilute the effectiveness of the material per pound of imidazoline.

A specific example of imidazoline of the above formula, which was used in the working examples of the invention, was a commercial 1-(2 amino ethyl-2-n-alkenyl-2-imidazoline) having the formula:

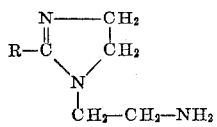

wherein R represents heptadecenyl and heptadecadienyl chains in a mol ratio of about 1:1, respectively. This product is available under the name Nalcamine G-39M.

The acid reacted with the imidazoline to form the salt surfactant, includes inorganic mineral acids such as ortho, pyro and meta phosphoric acids, hydrochloric acid, sulfuric acid, nitric acid, and also phytic acid which is closely related to phosphoric acid and possibly forms phosphoric acid salt in the present process.

Phytic acid is the hexaphosphoric acid ester of inositol. It is a strong acid containing twelve acidic hydrogen groups. Its structural formula is believed to be as follows:

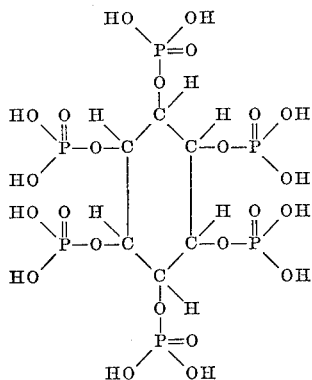

This material, having a molecular weight of 660 with 12 reactive hydrogen groups, has a combining weight (mole equivalent weight) of 55.

Phytic acid is derived from grain, and is a by-product from waste corn steep liquor. A description of phytic acid and its preparation is given in Chemical Engineering, January 27, 1958, under the title "Ion Exchange Now Yields Phytic Acid," published by McGraw-Hill Publishing Co., Inc., New York, New York.

The amino imidazoline salt is prepared by mixing the imidazoline and appropriate acid, preferably in a small amount of inert hydrocarbon oil, to form the imidazoline salt. Then, an aqueous solution, preferably saturated, of the salt to be finely divided, e.g. trisodium phosphate, is stirred into the mixture of oil and the imidazoline salt. Then, water is removed by heating or distillation to form a grease-like mass, which can be then used in preparing the final grease composition.

If a stabilizer for the alkali metal phosphate is used, then usually about 5 to 40, e.g. 10 to 30 wt. percent of stabilizer, based on the weight of alkali metal phosphate, will be used.

Various other additives may also be added to the lubricating composition (e.g. 0.1 to 10.0 weight percent) of detergents such as calcium petroleum sulfonate; oxidation inhibitors such as phenyl-alpha-naphthylamine; corrosion inhibitors, such as sorbitan monooleate; dyes; other grease thickeners, and the like.

The lubricants of the invention can be formed in a number of different ways. The most convenient is to co-neutralize all the carboxylic acids in at least a portion of the oil, with alkali metal base. Usually, the resulting composition will then be heated to about 300° to 550° F., preferably 400 to 500° F. to dehydrate the composition. The higher temperature of 400 to 500° F. will result in the formation of a salt material having greater thickening effect and better load and E.P. properties than the lower dehydration temperatures.

The invention will be further understood by reference to the following examples wherein all parts are by weight.

EXAMPLE I 58.5 parts of mineral lubricating oil of 55 SUS viscosity at 210° F., 15 parts of isooleic acid (Emery 636 Fatty Acid) and 4 parts of sebacic acid were charged to a fire-heated grease kettle and intimately mixed. 10 parts of glacial acetic acid was then added to the kettle, followed immediately by the addition of 11.5 parts of sodium hydroxide (100%) in the form of an aqueous solution consisting of 40 wt. percent of sodium hydroxide and 60 wt. percent water. Heating was then initiated and the temperature of the reaction mass was raised over a period of about 2 hours to 425° F. which was maintained for about ¼ hour. The grease was then cooled, while mixing, to 250° F. where 1 part of phenyl-alpha-naphthylamine was added as an oxidation inhibitor. After this, the grease was further cooled to 120° F. where it was homogenized in a Gaulin homogenizer thereby forming a uniform smooth structure.

EXAMPLE II

A grease was prepared in the same general manner as that of Example I except that 4 parts of 1,12-dodecane dicarboxylic acid was used in place of sebacic acid.

Comparison Grease A

This grease was prepared in the same general manner as Example I except that 4 parts of azelaic acid was used in place of sebacic acid.

The greases of Examples I and II, and Comparison Grease A were subjected to a number of standard tests and also a ball bearing temperature rise test. In this latter test, a 204 mm. steel ball bearing is packed with 3.0 grams of the grease to be tested and the bearing is then operated at 10,000 r.p.m. while the temperature of the grease in the bearing is continually measured by thermocouples placed on the outer bearing race.

The formulations of the above grease compositions and their physical properties are summarized in Table I which follows:

Table I

| | Examples | | |
|---|---|---|---|
| | I | II | Grease A |
| Formulation (Percent Wgt.): | | | |
| Glacial Acetic Acid | 10.0 | 10.0 | 10.0. |
| Iso-oleic Acid | 15.0 | 15.0 | 15.0. |
| Sebacic Acid | 4.0 | | |
| Dodecane Acid | | 4.0 | |
| Azelaic Acid | | | 4.0. |
| Sodium Hydroxide | 11.5 | 11.5 | 11.5. |
| Phenyl-alpha-naphthylamine | 1.0 | 1.0 | 1.0. |
| Mineral Lubricating Oil, 55 SUS at 210° F | 58.5 | 58.5 | 58.5. |
| Properties: | | | |
| Appearance | Excellent, smooth grease. | Excellent, smooth grease. | Grainy. |
| Dropping Point, ° F | 500+ | 500+ | 500+. |
| ASTM Penetration, 77° F. mm./10: | | | |
| Unworked | 290 | 290 | 290. |
| Worked 60 strokes | 310 | 310 | 310. |
| Worked 10,000 strokes | 300 | 300 | 300. |
| Roll Milled unworked | 198 | 198 | 198. |
| 450° F. Beaker Test [1] | No phase change, slight softening. | No phase change, slight softening. | No phase change, slight softening. |
| Lubrication Life,[2] 10,000 r.p.m.: | | | |
| 250° F | 2,000+ | 2,000+ | |
| 300° F | 2,000+ | 2,000+ | |
| 350° F | 500 | 450 | |
| Temperature Bearing Rise: | | | No further testing due to poor appearance of grease. |
| Room temp., ° F., start | 80 | 80 | |
| 15 minutes running | 140 | 135 | |
| 1 hour running | 90 | 95 | |
| 24 hours running | 85 | 85 | |

[1] Consists of slow heating to 450° F. while slowly stirring and observing changes, if any, in the consistency of the grease.
[2] ABEC-NLGI Spindle Test.

As seen by the preceding table, greases of Examples I and II were excellent uniform soft greases having good lubrication life, while the comparison Grease A gave a grainy gritty grease. This illustrates the criticality of the molecular weight of the dicarboxylic acid, since molecular weights below 190, for example azelaic acid of 188 molecular weight are unsuitable in the practice of the present invention. Another comparison grease made in the same method as the grease of Example I, but using 4.0 wt. percent of a $C_{19}$ branched chain Koch acid gave a lubrication life of only 426 hours at 250° F. as compared to over 2,000 hours of life for the greases of Examples I and II, thereby illustrating the poor performance obtained when the molecular weight of the dicarboxylic acid is too high.

A series of comparisons between the greases of the invention and two closely related prior art sodium complex mixed salt grease sold for ball-bearing lubrication and hereinafter designated Grease B and Grease C was carried out.

Grease B consisted of mineral lubricating oil thickened with a sodium mixed-salt thickener prepared by coneutralizing with NaOH a mixture of stearic acid and acetic acid, followed by heating to 410° F. until dehydrated and of satisfactory soap dispersion. The grease is then cooled, and an oxidation inhibitor is added, followed by further cooling to 110° F. where the grease is Morehouse milled and then packaged.

Grease C was a grease prepared by alkali-fusion of rapeseed oil.

In this process, rapeseed oil is heated in mineral oil with NaOH to hydrogen evolving temperatures to form mixed sodium salts of high and low molecular weight carboxylic acids resulting from the alkali fusion.

Greases B and C are both premium ball-bearing greases and the latter has been a leader in its field for about 20 years. Greases B and C are each currently sold in hundreds of thousand pounds per year.

The lubrication lives of greases of Example I and Greases B and C in the ABEC–NLGI spindle test carried out using at 204 mm. antifriction ball-bearing operating at 10,000 hours at different temperatures are summarized in Table II, which follows:

Table II
LUBRICATION LIFE, ABEC–NLGI SPINDLE TEST

| Grease | Life in Hours | | |
|---|---|---|---|
| | 250° F. | 300° F. | 350° F. |
| Grease B | 1,800 | 350 | 50 |
| Grease C | 2,000 | 300 | 50 |
| Grease of Example I | 2,000+ | 2,000+ | 500 |

As seen by Table II, the grease of Example I, was superior to the two commercial greases, particularly at the higher temperatures. The significance of this difference in actual practice is that electric motors and other high temperature appliances of advanced design can now be operated and satisfactorily lubricated for considerably longer periods of time and at higher temperatures than could be obtained by these prior premium bearing greases.

A pressure viscosity test was carried out on the greases of Examples I and II compared with the prior art complex Grease C, described above. This test was carried out by forcing the grease at the rate of 3 cubic cms. per minute throug a capillary of 0.002" at varying temperatures while measuring the pressure in terms of pounds per sq. inch required to maintain the 3 c.c./min. rate of flow. This test provides an indication of viscosity of the crease as it behaves under pressure at varying temperatures. The results of these tests are plotted in FIGURE I of the drawing which shows that the greases of Examples I and II consistently and slowly declined in their apparent viscosity upon increasing temperatures. On the other hand, the prior art grease (Grease C) actually began to thicken or increase in viscosity at temperatures of below 300° F., after which it again began to decline in viscosity. This latter phenomenon had been somewhat of a drawback in the marketing of this prior complex grease insofar as this indicates a phase change in the soap thickener system, changing from a smooth uniform dispersion capable of excellent lubrication, to a rubbery fibrous homogeneous dispersion which is no longer capable of good lubrication.

As indicated above, the greases of the invention can be further improved by incorporating finely divided phosphate into the grease. This will be illustrated by the following examples:

EXAMPLE III

*Part A.*—10 parts of Nalcamine G–39–M and 17.8 parts of mineral lubricating oil were mixed together, and 2.2 parts of phytic acid (100%) was then added in the form of a 70% aqueous solution. This resulted in forming the Nalcamine phytate which thickened the oil to a grease consistency. 70 parts of hydrated trisodium ortho phosphate ($Na_3PO_4 \cdot 12\ H_2O$) was then added in the form of a 40 wt. percent aqueous solution. The entire mixture was then heated to boiling until about 50 wa. percent of the free water present was removed by evaporation. Upon cooling, the composition was a very stable gel having a total water content of 50 wt. percent, based on the total weight of said gel.

*Part B.*—A grease was prepared as follows: 59.5 parts of mineral lubricating oil of 55 SUS at 210° F., 15 parts of the isooleic acid (same as in Examples I and II), and 4 parts of dibasic aliphatic aromatic acid obtained from a catalytic cycle stock extract was charged to a fire-heated grease kettle and intimately mixed. To this mixture was added 10 parts of glacial acetic acid, followed immediately by the addition of 10.5 parts of sodium hydroxide in the form of an aqueous solution consisting of 40 wt. percent sodium hydroxide dissolved in 60 wt. percent water. Heating was initiated and the temperature of the reaction mixture was raised to 440° F., which temperature was maintained for about 15 minutes. The grease was then cooled to 250° F., where 1 part of phenyl-alpha-naphthylamine was added as an oxidation inhibitor, after which the grease was further cooled to 100° F. A portion of the grease was then removed and homogenized in a Gaulin homogenizer operating at 1500 p.s.i.

*Part C.*—The balance of the grease remaining in the grease kettle was reheated to 400° F. where 4 parts of the colloidal dispersion of sodium phosphate in mineral oil stabilized with the reaction product of imidazoline and phytic acid (product of Part A) was then added. The grease was again cooled while agitating to 100° F. where it was homogenized in a Gaulin homogenizer operating at 1500 p.s.i.

The alkyl aromatic dicarboxylic acid used above was a mixture of acids having molecular weights of about 450 to 550. This acid had a saponification number of about 200 mg. KOH/gram. It was derived from an aromatic extract by treatment with sodium, then $CO_2$, followed by hydrolysis. The extract was obtained by extraction of a catalytic cycle stock. This stock consisted of about 17 wt. percent 3-ring aromatics, and about 63 wt. percent 4-ring aromatics, the remainder being mainly naphthenes with small amounts of thiophenes, paraffins, etc. The acid was prepared from the stock as follows:

One-half mole equivalent of catalytic cycle extract was dissolved in 350 ml. of tetrahydrofuran (THF) and added dropwise to a stirred mixture of 1 gram atom of sodium metal chips in 150 ml. THF. During the 3 hours' addition time, the reaction mixture became reddish, then finally black, and the temperature rose from about 26° to 36° C. After the addition was completed, the reaction mixture was heated to reflux (about 68° C.) and stirred at reflux temperature for an additional 3.75 hours. Nearly all of the sodium metal had reacted, indicating that the disodio adduct of the reactive polynuclear aromatic hydrocarbons in the feed had formed. The disodio adduct was then poured in an inert atmosphere onto several pounds of powdered solid carbon dioxide, the resultant slurry stirred several times, and the mixture then allowed to stand until the excess carbon dioxide evaporated. After the mixture had warmed to room temperature, 25 ml. of methanol was added with stirring to destroy any excess sodium metal. About 2000 ml. of water was added and the mixture allowed to stand. The organic layer (containing unreactive components of the aromatic extract feed) was separated from the water layer, and the water layer washed with successive portions of pentane. Dilute HCl (90 ml. concentrated HCl in 250 ml. water) was added to the aqueous layer. The acidified mixture was extracted with successive portions of diethyl ether to remove the carboxylic acid product. Evaporation of the ether yielded a syrupy mixture of the polynuclear aromatic acids used above.

EXAMPLES IV TO VI

A series of greases were prepared as follows:

Mineral lubricating oil, isooleic acid, and sebacic acid were mixed in a grease kettle. Glacial acetic acid was then added to the mixture followed immediately by the addition of sodium hydroxide in the form of an aqueous solution consisting of 40 wt. percent sodium hydroxide. The composition was then heated to about 300° F. where trisodium phosphate was added in the form of an aqueous solution containing 50 wt. percent of $Na_3PO_4 \cdot 12H_2O$. Heating was then continued to about 450° F. to dehydrate the grease which was then cooled while stirring to 250° C. where phenyl-alpha-naphthylamine was added as an oxidation inhibitor. The product was then allowed to cool to about 100° F. where it was passed through a Gaulin homogenizer operating at about 1500 p.s.i.

The compositions and some of the various properties of the greases of Examples III to VI are summarized in Table III which follows:

*Table III*

| | Examples | | | | |
|---|---|---|---|---|---|
| | III–B | III–C | IV | V | VI |
| Formulation (Wgt. percent): | | | | | |
| Glacial Acetic Acid | 10.0 | 9.6 | 6.82 | 10.0 | 10.0 |
| Isooleic Acid | 15.0 | 14.4 | 10.23 | 15.0 | 15.0 |
| Alkyl Aromatic Dicarboxylic Acid | 4.0 | 3.8 | | | |
| Sebacic Acid | | | 2.73 | 4.0 | 4.0 |
| Sodium Hydroxide | 10.5 | 10.0 | 7.84 | 11.5 | 11.5 |
| Sodium Phosphate | | [1] 4.0 | 2.73 | 3.0 | 4.0 |
| Phenyl α-Naphthylamine | 1.0 | 1.0 | 0.68 | 1.0 | 1.0 |
| Mineral Oil | 59.5 | 57.2 | 68.97 | 55.5 | 54.5 |
| Mole eq. ratio, Acetic/dicarb. acid | 10/1 | 10/1 | 4.2/1 | 4.2/1 | 4.2/1 |
| Mole eq. ratio, Isooleic/dicarb. acid | 3.3/1 | 3.3/10 | 1.2/1 | 1.3/1 | 1.3/1 |
| Properties: | | | | | |
| Appearance | [2] | [2] | [3] | [3] | [3] |
| Dropping Point, °F | 500 | 500 | 475 | 500 | 500 |
| ASTM Penetrations, 77° F., mm./10: | | | | | |
| Unworked | 204 | 250 | 248 | 201 | 212 |
| Worked 60 strokes | 250 | 282 | 255 | 216 | 252 |
| Worked 10,000 strokes | 282 | 292 | 312 | 272 | 282 |
| Lubrication Life,[4] 10,000 r.p.m. in hours: | | | | | |
| 250° F | 2,000+ | 2,000+ | | 2,000+ | 2,000+ |
| 300° F | 728 | 2,000+ | 1,300 | 2,000+ | 2,000+ |
| 350° F | 275 | 344 | | 445 | 435 |

[1] Colloidal dispersion.
[2] Excellent, smooth grease.
[3] Excellent.
[4] ABEC–NLGI Spindle Test.

As seen by a comparsion of the composition of Example III–C with III–B, the addition of the trisodium phosphate materially increased the lubrication life at 300° F. and 350° F. level. Also, the composition of Example IV, shows the longer lubrication life obtained at the 300° F. level, while the compositions of Examples V and VI show that upon increasing the amount of trisodium phosphate, that even longer high temperature lubrication lives were obtained.

EXAMPLE VII

Example III, Parts A and B are repeated, except that 4 parts of dibasic alkyl aromatic acid of the structure

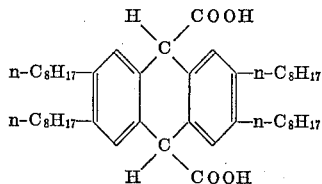

is used in place of the aromatic acid of Example III, and the amount of sodium hydroxide used in such as to give a neutral product.

While the preceding have been directed primarily to greases suitable for bearing lubrication, other lubricating uses of the compositions of the invention are contemplated.

What is claimed is:

1. A channelling-type high temperature lubricating grease useful for lubricating ball bearings, comprising a major amount of lubricating oil and a thickening amount within the range of 20 to 49 wt. percent of sodium mixed salt of $C_2$ to $C_4$ fatty acid, dicarboxylic acid selected from the group consisting of $C_{10}$ to $C_{16}$ aliphatic dicarboxylic acid and alkyl polynuclear aryl dicarboxylic acids having 3 to 4 rings and a total of 0 to 6 alkyl groups of 1 to 8 carbon atoms each, and $C_{12}$ to $C_{24}$ fatty acid, in a molar hydrogen equivalent ratio of about 2 to 10 molar hydrogen equivalent proportions of said $C_2$ to $C_4$ fatty acid per molar hydrogen equivalent of said dicarboxylic acid, and about 1 to 4 molar hydrogen equivalents of said $C_{12}$ to $C_{24}$ fatty acid per molar hydrogen equivalent of said dicarboxylic acid.

2. A lubricating composition according to claim 1, wherein said alkyl polynuclear dicarboxylic acid is a mixture of acids prepared from an aromatic extract derived by extraction of catalytic cracking cycle stock.

3. A high temperature lubricating grease composition suitable for ball bearing lubrication comprising a major amount of mineral lubricating oil, and about 20 to 49 wt. percent of a sodium mixed salt thickener system of acetic acid, $C_{10}$ to $C_{16}$ aliphatic saturated dicarboxylic acid and $C_{12}$ to $C_{24}$ fatty acid in a mole hydrogen equivalent ratio of about 3 to 6 mole equivalent proportions of said acetic acid per mole equivalent of said dicarboxylic acid, and about 1 to 4 mole equivalents of said higher monocarboxylic acid per mole equivalent of said dicarboxylic acid.

4. A grease composition according to claim 3, wherein said dicarboxylic acid is sebacic acid.

5. A grease composition according to claim 3, wherein said dicarboxylic acid is 1,12 dodecanedioic acid.

6. A grease composition according to claim 3 also containing 1 to 6 wt. percent trisodium orthophosphate.

References Cited by the Examiner

UNITED STATES PATENTS

| | | | |
|---|---|---|---|
| 2,417,428 | 3/1947 | McLennan | 252—39 |
| 2,417,429 | 3/1947 | McLennan | 252—39 |
| 2,699,428 | 1/1955 | Lux et al. | 252—35 |
| 2,710,838 | 6/1955 | Morway et al. | 252—41 |
| 2,846,392 | 8/1958 | Morway et al. | 252—39 |
| 2,880,174 | 3/1959 | Morway et al. | 252—39 |
| 2,940,930 | 6/1960 | Pattenden et al. | 252—39 |
| 2,988,506 | 6/1961 | Sproule et al. | 252—25 |

DANIEL E. WYMAN, *Primary Examiner.*